(12) United States Patent
Cox et al.

(10) Patent No.: US 11,821,365 B2
(45) Date of Patent: Nov. 21, 2023

(54) INDUCER SEAL WITH INTEGRATED INDUCER SLOTS

(71) Applicant: General Electric Company, Schenectady, NY (US)

(72) Inventors: Christopher P. Cox, Greenville, SC (US); Lucas Wedmore, Greenville, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 24 days.

(21) Appl. No.: 17/649,374

(22) Filed: Jan. 31, 2022

(65) Prior Publication Data

US 2023/0243304 A1 Aug. 3, 2023

(51) Int. Cl.
*F02C 7/28* (2006.01)
*F02C 7/12* (2006.01)
*F01D 11/12* (2006.01)

(52) U.S. Cl.
CPC .............. *F02C 7/12* (2013.01); *F01D 11/122* (2013.01); *F02C 7/28* (2013.01); *F05D 2240/55* (2013.01); *F05D 2260/20* (2013.01)

(58) Field of Classification Search
CPC ...... F16J 15/324; F16J 15/3404; F01D 5/081; F01D 5/085; F01D 11/122; F05D 2260/14; F02C 7/12; F02C 7/28
See application file for complete search history.

(56) References Cited

U.S. PATENT DOCUMENTS

| 4,541,774 A * | 9/1985 | Rieck ...................... F01D 5/085 415/115 |
| 4,657,482 A | 4/1987 | Neal |
| 4,668,163 A * | 5/1987 | Kervistin .............. F01D 11/001 415/115 |
| 7,252,291 B2 * | 8/2007 | Khonsari ............. F16J 15/3404 277/408 |
| 8,529,195 B2 * | 9/2013 | Widener ................... F02C 7/18 415/176 |
| 8,613,199 B2 * | 12/2013 | Kimmel ................. F01D 5/081 415/121.2 |
| 9,435,206 B2 * | 9/2016 | Johnson ................. F01D 5/087 |
| 2006/0103073 A1 * | 5/2006 | Khonsari ............. F16J 15/3404 277/359 |
| 2007/0114728 A1 * | 5/2007 | Schollhorn ............ F16J 15/442 277/411 |
| 2011/0247346 A1 * | 10/2011 | Kimmel .................... F02C 7/12 60/806 |
| 2012/0087784 A1 * | 4/2012 | Widener ................... F02C 6/08 415/180 |
| 2014/0072420 A1 | 3/2014 | Johnson et al. |

* cited by examiner

*Primary Examiner* — Eldon T Brockman
(74) *Attorney, Agent, or Firm* — Eversheds Sutherland (US) LLP

(57) ABSTRACT

The present application provides an inducer seal configured to provide a flow of air to a rotor shaft within a turbine of a gas turbine engine. The inducer seal includes a ring plate having an outer surface with a circumferential channel and an inner surface having an abradable seal. A number of inducer slots are positioned in the ring plate that extend from the outer surface to the inner surface such that the flow of air may pass therethrough in a tangential direction relative to rotation of the rotor shaft to cool the rotor shaft.

17 Claims, 4 Drawing Sheets

INDUCER SEAL WITH INTEGRATED INDUCER SLOTS

TECHNICAL FIELD

The present application and the resultant patent relate generally to gas turbine engines and more particularly relate to an inducer seal with integrated inducer slots to provide a flow of air with tangential velocity to cool a turbine rotor shaft and other components.

BACKGROUND

In a gas turbine engine, hot combustion gases generated in one or more combustors generally may flow along a hot gas path extending through a turbine. The turbine may be subjected to high temperatures resulting from the flow of combustion gases along the hot gas path, which may result in the generation of high thermal stresses in these components and the interfaces therebetween. Because the efficiency of a gas turbine engine is largely dependent on the operating temperatures, there is an ongoing demand for components positioned along and within the hot gas path to be capable of withstanding increasingly higher temperatures without deterioration, failure, or a decrease in the overall useful lifetime.

Examples of components and areas of the turbine that should be cooled to prevent damage include the rotor shaft as well as the wheel space of the turbine section, i.e., the area of the turbine section surrounding the turbine rotor wheels. As the temperature along the hot gas path increases, the components therein may be subject to thermal expansion. This thermal expansion may eventually cause the various components to rub or otherwise contact each other and/or may create excessive stresses and possible creep deformation therein. Limiting such contact, stress, and/or deformation may increase overall component lifetime.

SUMMARY

The present application and the resultant patent thus provide an inducer seal configured to provide a flow of air to a rotor shaft within a turbine of a gas turbine engine. The inducer seal includes a ring plate with an outer surface with a circumferential channel and an inner surface with an abradable seal. A number of inducer slots are positioned in the ring plate that extend from the outer surface to the inner surface such that the flow of air may pass therethrough with tangential velocity to cool the rotor shaft.

The present application and the resultant patent further provide a method of cooling a rotor shaft in a turbine of a gas turbine engine with a flow of air. The method includes the steps of forming inducer slots with a scoop-like shape in an aft inducer seal, providing the flow of air to the inducer slots in the aft inducer seal, creating tangential velocity in the flow of air by the scoop-like shape of the inducer slots, and cooling the rotor shaft with the flow of air.

The present application and the resultant patent further provide a gas turbine engine. The gas turbine engine includes a compressor for providing a flow of air, a turbine, a rotor shaft extending through the compressor and the turbine, and an inducer seal configured to provide a portion of the flow of air to the rotor shaft. The inducer seal includes a ring plate with a number of inducer slots positioned therein such that the flow of air may pass therethrough with tangential velocity to cool the rotor shaft.

These and other features and improvements of this application and the resultant patent will become apparent to one of ordinary skill in the art upon review of the following detailed description when taken in conjunction with the several drawings and the appended claims.

DETAILED DESCRIPTION

Figure 1:
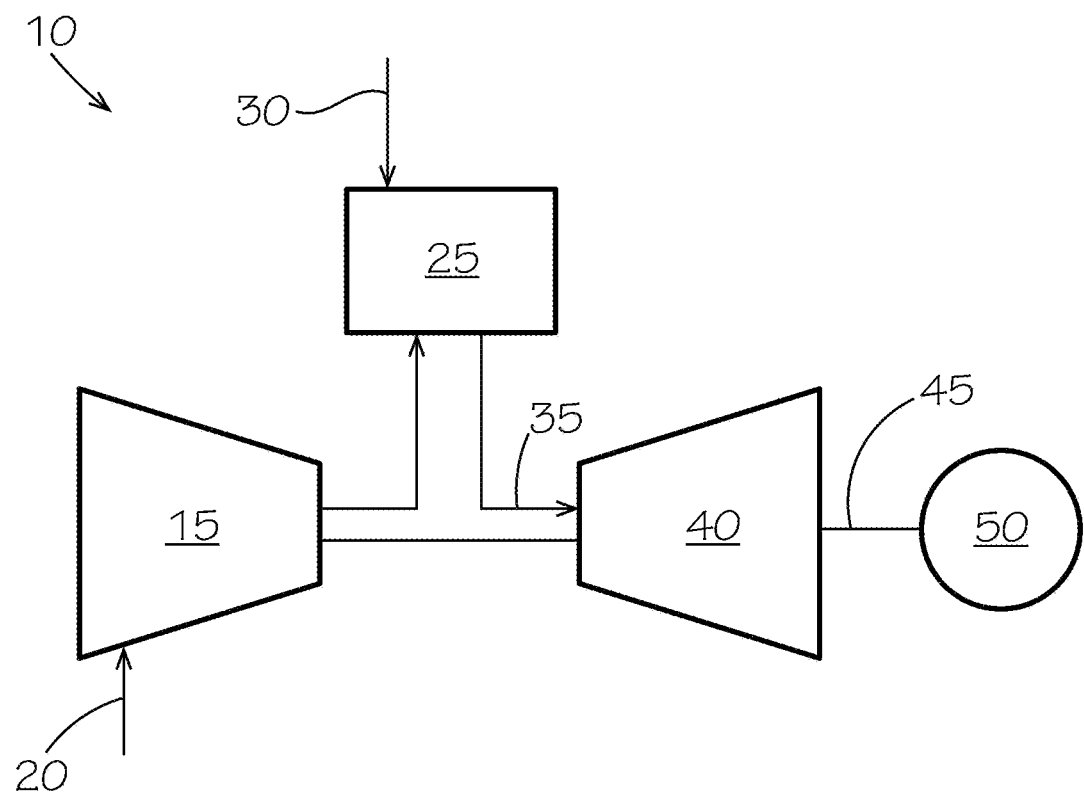
FIG. 1 is a schematic diagram of an exemplary gas turbine engine including a compressor, a combustor, a turbine, a rotor shaft, and an external load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25 (e.g., multiple combustor cans). Each combustor can 25 mixes the compressed flow of air 20 with a pressurized flow of fuel 30 and ignites the mixture to create a flow of hot combustion gases 35. Although only a single combustor can 25 is shown, the gas turbine engine 10 may include any number of combustor cans 25 positioned in a circumferential array around a rotor shaft 45. Alternatively, the combustor 25 may be an annular combustor. The flow of the hot combustion gases 35 is in turn delivered to a turbine 40. The flow of the hot combustion gases 35 drives the turbine 40 to produce mechanical work. The mechanical work produced in the turbine 40 drives, via the rotor shaft 45, the compressor 15, and an external load 50, such as an electrical generator and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, New York, including, but not limited to, those such as a 7-series or a 9-series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

Figure 2:
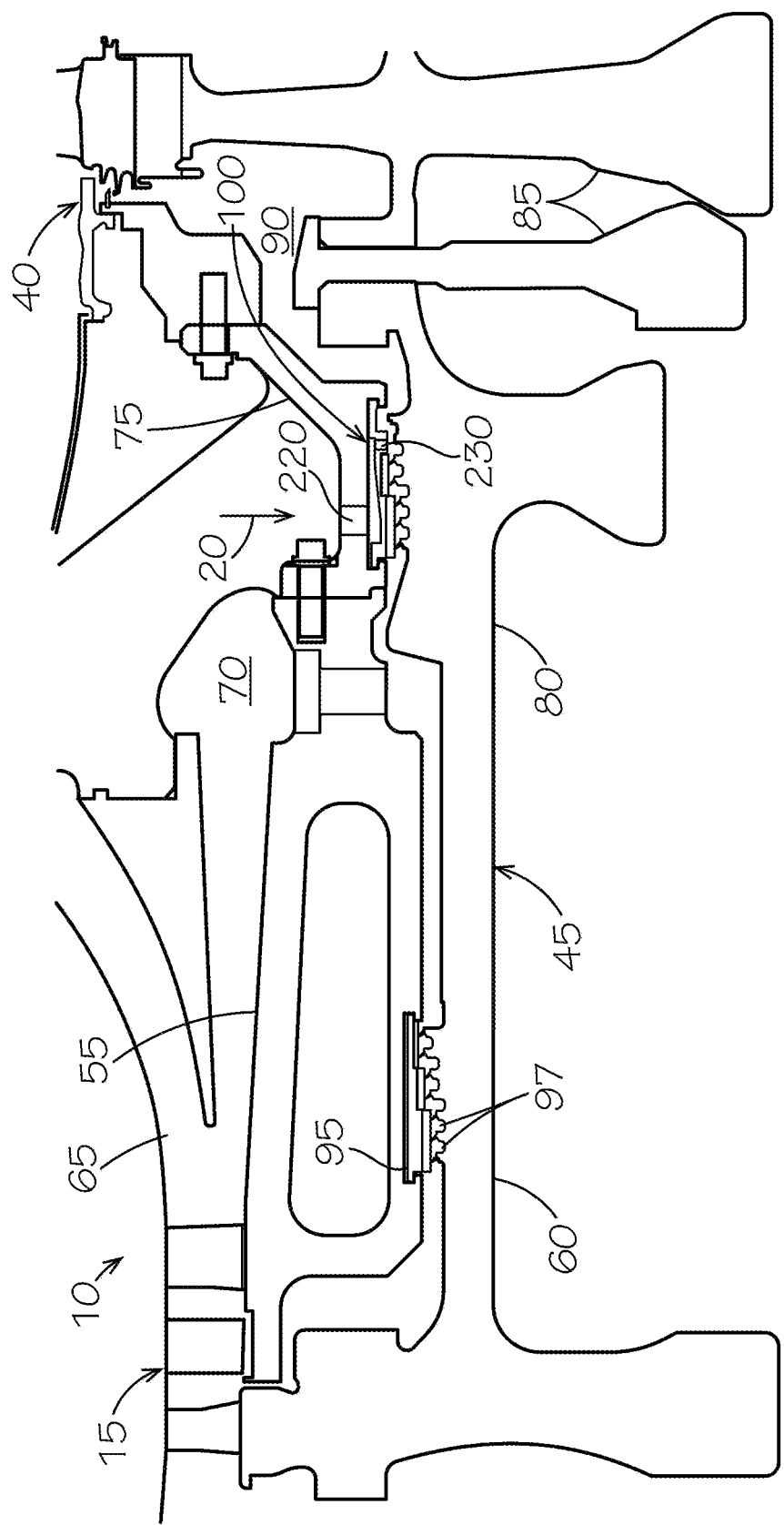
FIG. 2 is a sectional view of the compressor and the turbine of the gas turbine engine of FIG. 1 with inducer seals as may be described herein positioned adjacent to the rotor shaft.
Figure 3:
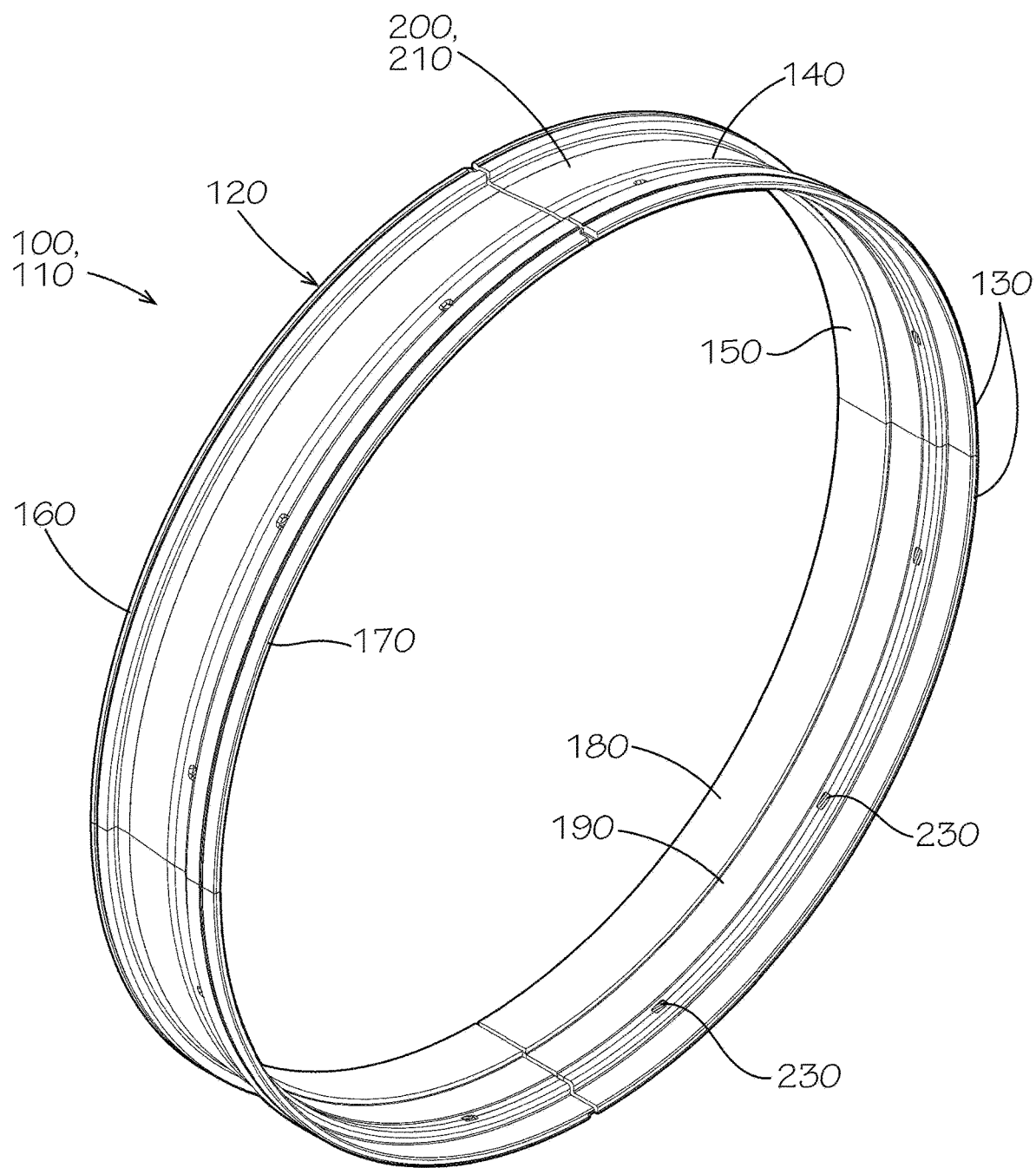
FIG. 3 is a perspective view of an aft inducer seal of FIG. 2 with a number of inducer slots defined therethrough.
Figure 5:
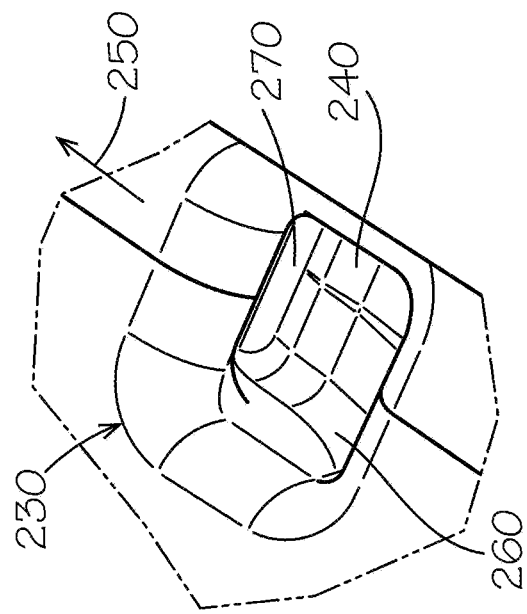
FIG. 5 is an enlarged perspective view of the inducer slot in the aft inducer seal of FIGS. 2 and 3.
Figure 4:
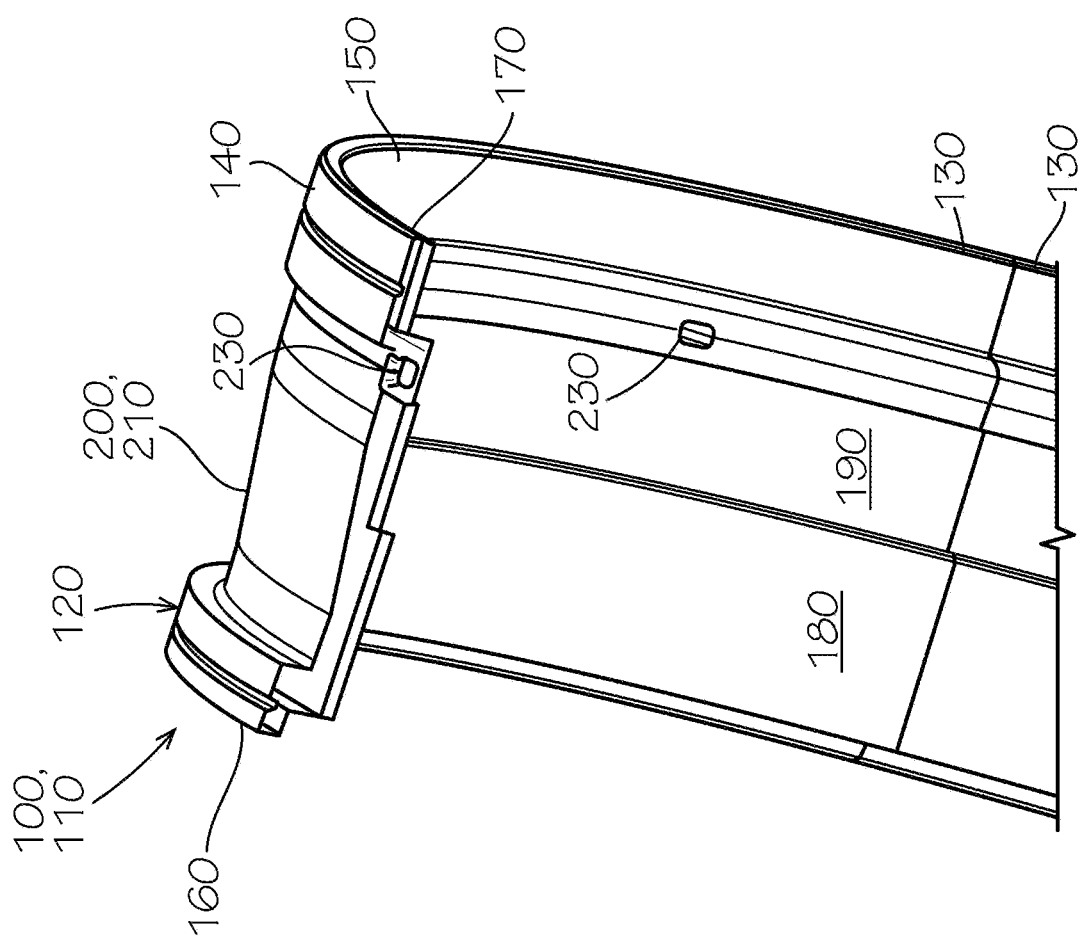
FIG. 4 is a partial sectional view of the aft inducer seal of FIGS. 2 and 3 with the inducer slot defined therethrough.

FIG. 2 shows portions of the compressor 15 and the turbine 40 of the gas turbine engine 10 in more detail. As is shown, the compressor 15 generally includes a compressor stator component 55, a portion of which may be known as a compressor discharge casing, and an inner rotor component 60. The compressor 15 further may include a diffuser 65, which may be at least partially defined by the compressor stator component 55. A discharge plenum 70 may be provided adjacent to and in fluid communication with the diffuser 65. As described above, the flow of air 20 may travel through and may be pressurized in the compressor 15. The diffuser 65 and the discharge plenum 70 may facilitate the channeling of the flow of air 20 to the combustor 25. Specifically, the flow of air 20 may flow from the discharge plenum 70 to the combustor 25.

The turbine 40 generally includes a turbine stator component 75 and an inner rotor component 80. The inner rotor component 80 may be joined to a turbine wheel 85, which may be disposed in a turbine wheel space 90. Various turbine rotor blades (not shown) may be mounted to the turbine wheels 85, while turbine stator blades (not shown) may be mounted to the casing of the turbine 40 (e.g., the turbine stator component 75). The rotor blades and stator blades may generally form turbine stages. The compressor inner rotor component 60 and the turbine inner rotor component 80 may be joined together or may be formed as a singular component and thus may define a portion of the rotor shaft 45. The compressor stator component 55 and the turbine stator component 75 may be joined together to form some or all of a gas turbine casing.

One or more inducer seals 95, 100 may be positioned about the rotor shaft 45 in either or both of the compressor 15 or the turbine 40. The inducer seals 95 may be abradable honeycomb-type seals and the like that may cooperate with a number of projections 97 on the rotor shaft 45. As described above, the inducer seals 95, 100 are positioned in area(s) of the rotor shaft 45 that may experience creep deformation given the high temperatures within the hot gas path.

FIGS. 2-5 show an example of an inducer seal 100 as may be described herein. In this example, the inducer seal 100 may be an aft inducer seal 110. Specifically, the aft inducer seal 110 may be position between the turbine stator component 75 and the inner stator component 80 of the rotor shaft 45 adjacent to the wheel space 90 of the turbine 40.

The aft inducer seal 110 may be in the form of a ring plate 120. The ring plate 120 may include any number of arcuate segments 130 to form a 360-degree circumferential body. The ring plate 120 may be made out of 300 or 400 series stainless steel or similar types of substantially rigid, heat resistant materials. The ring plate 120 may extend radially from an outer surface 140 to an inner surface 150. In axial-cross section (FIG. 4), the ring plate 120 may extend from a forward flange 160 to an aft flange 170.

The inner surface 150 may include a number of abradable seals. In this example, a first, or an axially forward, abradable seal 180 and a second, or an axially aft abradable seal 190 are shown. The abradable seals 180, 190 may be conventional honeycomb seals or other types of solid, porous materials. Any number of the abradable seals 180, 190 may be used herein. Other components and other configurations may be used herein.

The outer surface 140 of the ring plate 120 may include a circumferential channel 200 therein. The circumferential channel 200 may extend axially from the forward flange 160 to the aft flange 170. An axial span of the circumferential channel 200 may have a slanted floor 210. The slanted floor 210 may be deeper (i.e., have a smaller diameter) proximate to the forward flange 160 and may rise (i.e., increase in diameter) in the direction of the aft flange 170. The slope of the slanted floor 210 may vary. The circumferential channel 200 may be positioned to receive a portion of the flow of air 20 from the discharge plenum 70 or elsewhere. One or more seal plenums 220 or other passages may be in communication with the discharge plenum 70 and the circumferential channel 200.

The ring plate 120 of the aft inducer seal 110 also may include a number of inducer slots 230 formed therethrough.

The inducer slots 230 may extend from the circumferential channel 200 of the outer surface 140, through the ring plate 120, and through the inner surface 150. The inducer slots 230 may have an inlet 260 located in the circumferential channel 200 adjacent to the aft flange 170 on the outer surface 140 and may have an outlet 270 adjacent to the upper abradable seal 190 on the inner surface 150. The inducer slots 230 may have a substantially scoop-like shape 240 (FIG. 5) resulting from the inlet 260 being circumferentially offset from the outlet 270. The scoop-like shape 240 with its curved surface extending between the inlet 260 and the outlet 270 may direct the flow of air 20 largely in a tangential direction 250 with respect to the rotation of the rotor shaft 45. Other shapes, configurations, and directions may be used herein. Any number of the inducer slots 230 may be used herein. The inducer slots 230 may be positioned equidistantly about the ring plate 120. Other components and other configuration may be used herein.

In use, a portion of the flow of air 20 flows from the discharge plenum 70 and the seal plenum 220 or elsewhere towards the aft inducer seal 110. The flow of air 20 flows into the circumferential channel 200 of the ring plate 120 and through the inducer slots 230. The flow of air 20 passes through the inducer slots 230 and into the wheel space 90 adjacent to the rotor shaft 45 with a tangential velocity. The flow of air 20 thus provides cooling to the rotor shaft 45 and other areas downstream of the aft inducer seal 110.

The nature of the inducer slots 230 with the scoop-like shape 240 promotes tangential velocity in the flow of air 20 in the direction of rotor rotation so as to reduce the velocity of the air relative to the rotor shaft 45. This reduction in velocity serves to reduce the effective air temperature about the rotor shaft 45, thereby reducing or eliminating creep deformation and/or other types of damage. The aft inducer seal 110 with the inducer slots 230 may be original equipment or may be part of a retrofit. Integrating the inducer slots 230 directly into the aft inducer seal 110 may be accomplished with traditional manufacturing methods such as turning, milling, and the like.

It should be apparent that the foregoing relates only to certain embodiments of this application and resultant patent. Numerous changes and modifications may be made herein by one of ordinary skill in the art without departing from the general spirit and scope of the invention as defined by the following claims and the equivalents thereof.

We claim:

1. An inducer seal configured to provide a flow of air to a rotor shaft within a turbine of a gas turbine engine, the inducer seal comprising:
    a ring plate with an outer surface and an inner surface;
    a circumferential channel defined in the outer surface of the ring plate;
    an abradable seal disposed on the inner surface of the ring plate; and
    a plurality of inducer slots positioned in the ring plate that extend from the outer surface to the inner surface and are axially spaced from the abradable seal such that the flow of air may pass therethrough in a tangential direction with respect to rotation of the rotor shaft to cool the rotor shaft.

2. The inducer seal of claim 1, wherein the inducer seal comprises an aft inducer seal.

3. The inducer seal of claim 1, wherein the ring plate comprises a plurality of arcuate segments.

4. The inducer seal of claim 1, wherein the ring plate comprises a forward flange and an aft flange.

5. The inducer seal of claim 4, wherein the plurality of inducer slots is positioned adjacent to the aft flange.

6. The inducer seal of claim 1, wherein the plurality of inducer slots extends through the circumferential channel of the outer surface.

7. The inducer seal of claim 1, wherein the abradable seal comprises a plurality of abradable seals.

8. The inducer seal of claim 7, wherein the plurality of abradable seals comprises a forward abradable seal and an aft abradable seal.

9. The inducer seal of claim 1, wherein each of the plurality of inducer slots comprises a substantially scoop-like shape.

10. The inducer seal of claim 9, wherein the substantially scoop-like shape comprises an inlet in the outer surface that is circumferentially offset from an outlet in the inner surface to direct the flow of air in the tangential direction with respect to rotation of the rotor shaft.

11. The inducer seal of claim 1, wherein the plurality of inducer slots is positioned equidistantly about the ring plate.

12. The inducer seal of claim 1, wherein the ring plate is made from stainless steel.

13. A gas turbine engine, comprising:
a compressor for providing a flow of air;
a turbine downstream from the compressor;
a rotor shaft extending through the compressor and the turbine; and
an inducer seal configured to provide a portion of the flow of air to the rotor shaft;
wherein the inducer seal comprises a ring plate with an outer surface and an inner surface with an abradable seal and with a plurality of inducer slots defined therethrough and axially spaced from the abradable seal such that the flow of air may pass through the plurality of inducer slots in a tangential direction with respect to rotation of the rotor shaft to cool the rotor shaft.

14. The gas turbine engine of claim 13, wherein the inducer seal comprises an aft inducer seal.

15. The gas turbine engine of claim 13, wherein each of the plurality of inducer slots comprises a substantially scoop-like shape.

16. The gas turbine engine of claim 15, wherein the substantially scoop-like shape comprises an inlet in the outer surface that is circumferentially offset from an outlet in the inner surface to direct the flow of air in the tangential direction with respect to rotation of the rotor shaft.

17. An inducer seal configured to provide a flow of air to a rotor shaft within a turbine of a gas turbine engine, the inducer seal comprising:
a ring plate with an outer surface and an inner surface;
a circumferential channel defined in the outer surface of the ring plate;
an abradable seal disposed on the inner surface of the ring plate; and
a plurality of inducer slots positioned in the ring plate that extend from the outer surface to the inner surface such that the flow of air may pass therethrough in a tangential direction with respect to rotation of the rotor shaft to cool the rotor shaft;
wherein the ring plate comprises a forward flange and an aft flange; and
wherein the circumferential channel comprises a slanted floor extending from the forward flange to the aft flange.

* * * * *